(12) United States Patent
El-Hibri et al.

(10) Patent No.: US 6,329,493 B1
(45) Date of Patent: Dec. 11, 2001

(54) PLUMBING ARTICLES FROM POLY(ARYL ETHER SULFONES)

(75) Inventors: Mohammad J. El-Hibri, Atlanta; Barry L. Dickinson, Alpharetta, both of GA (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/411,921

(22) Filed: Oct. 4, 1999

Related U.S. Application Data

(60) Provisional application No. 60/103,198, filed on Oct. 6, 1998.

(51) Int. Cl.[7] .............................. C08G 75/20; F16L 9/12
(52) U.S. Cl. ........................ 528/125; 528/171; 528/174; 528/175; 525/534; 525/535; 525/537; 285/179; 285/185; 285/223; 251/142; 251/146; 251/148; 251/150
(58) Field of Search .................... 528/175, 171, 528/174, 125; 285/179, 185, 223; 251/142, 146, 148, 150; 525/535, 534, 537

(56) References Cited

U.S. PATENT DOCUMENTS

| 4,108,837 | * | 8/1978 | Johnson et al. ................ 528/174 |
| 5,235,019 | * | 8/1993 | Savariar ......................... 528/125 |
| 5,235,020 | * | 8/1993 | Savariar ......................... 528/125 |
| 5,239,043 | * | 8/1993 | Savariar ......................... 528/125 |
| 5,326,834 | * | 7/1994 | Sauers et al. ................... 525/534 |
| 5,366,257 |   | 11/1994 | McPherson et al. ........... 285/174 |
| 5,397,102 |   | 3/1995 | Kingman ....................... 251/368 |
| 5,631,333 | * | 5/1997 | Weber et al. .................. 525/535 |

FOREIGN PATENT DOCUMENTS

29719536U1    2/1998   (DE) .

* cited by examiner

*Primary Examiner*—P. Hampton-Hightower
(74) *Attorney, Agent, or Firm*—Thomas E. Nemo

(57) ABSTRACT

Plumbing articles made from a thermoplastic resin comprising a poly(biphenyl ether sulfone) and a poly(aryl ether sulfone) comprising bisphenol A residues.

13 Claims, 1 Drawing Sheet

PLUMBING ARTICLES FROM POLY(ARYL ETHER SULFONES)

This application claims the benefit of U.S. Provisional Application No. 60/103,198, filed Oct. 6, 1998.

FIELD OF THE INVENTION

This invention relates to plumbing articles made from a thermoplastic resin which are especially suitable for use in hot water applications. More particularly, this invention relates to plumbing articles which are especially suitable for use in hot water applications and wherein the thermoplastic resin used to make the plumbing articles comprises a blend of two poly(aryl ether sulfones). The blend provides for outstanding retention of tensile elongation after prolonged exposure to hot water.

BACKGROUND OF THE INVENTION

Pipes, pipe fittings such as "elbows" and pipe couplers, valves and supply manifolds as well as other plumbing parts are used in systems for distributing water and other liquids in a variety of applications. Perhaps the most common use is the supply of water to houses, apartments, and commercial and other industrial building for use by the occupants for drinking, cooking, cleaning and other sanitary applications. For many years, the standard material used for manufacturing the pipes, fixtures, couplings, and other plumbing articles has been metal, primarily copper and brass. However, more recently, the industry has turned to using alternative materials for manufacturing such plumbing articles. Plastic materials, in particular, are now widely used. Plastics offer advantages in that they are generally lighter in weight, more easily cut and shaped and, during the construction of a home or commercial building, the plumber can connect the plastic pipes using an adhesive or an adhesive-less coupler. Whereas, with copper or brass pipes and fittings, the plumber would be required to solder the joints in order to make a tight, leak-proof connection. Additionally, copper and brass plumbing articles are susceptible to corrosion, scale and lime build-up, and metal pipes affect the taste of drinking water. Plastic pipes and other plumbing articles do not suffer these drawbacks.

One of the major problems with many plastic piping, fittings and fixtures for plumbing applications, however, is the inability of the plastic materials to withstand hot water. While certain thermoplastic materials such as Radel R, a high performance poly(aryl ether sulfone), available from Amoco Polymers Inc., can be used to manufacture piping and other plumbing components for use in hot water applications, Radel R, as with many other high performance polymeric materials, is relatively expensive.

The art, therefore, needs piping and other plumbing articles manufactured from a thermoplastic resin, which is lower in cost but which can also withstand hot water service. The instant invention provides such plumbing components or articles wherein the plumbing articles are manufactured from a blend of at least two poly(aryl ether sulfones). The preferred blend comprises a poly(biphenyl ether sulfone) and a second poly(aryl ether sulfone) comprising bisphenol A residues. This blend of poly(aryl ether sulfones) provides for plumbing articles having outstanding resistance to hot water at a cost which is substantially reduced compared to, for example, that of plumbing articles manufactured from Radel R poly(aryl ether sulfones) or similar materials.

SUMMARY OF THE INVENTION

Plumbing articles made from a thermoplastic resin comprising a poly(biphenyl ether sulfone) and a second poly (aryl ether sulfone) comprising bisphenol A residues.

DETAILED DESCRIPTION OF PREFERRED EMBODIMENTS

Figure 1:
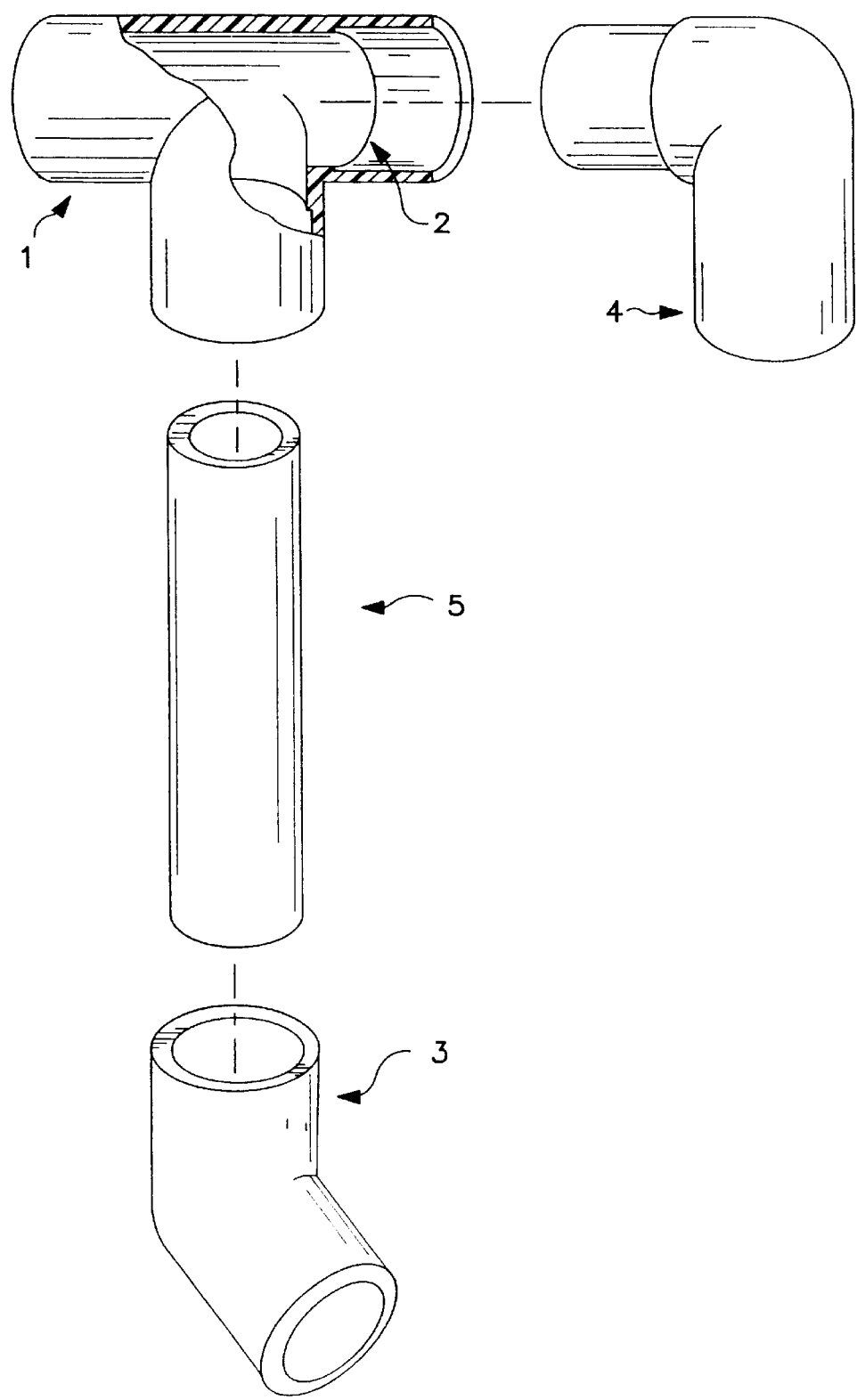
FIG. 1 shows a selection of plumbing articles of this invention which can be made with a thermoplastic resin comprising a poly(biphenyl ether sulfone) and a second poly(aryl ether sulfone) comprising bisphenol A residues.

This invention relates to plumbing articles made from a thermoplastic resin comprising a blend of at least two poly(aryl ether sulfones). The preferred blend comprises a poly(biphenyl ether sulfone) and a second poly (aryl ether sulfone) comprising bisphenol A residues.

The plumbing articles of this invention can be of any type. For example, they can be pipes or tubes, pipe couplers, valve casings and valve parts, elbow joints of a variety of angles, manifolds and fixtures. The articles of this invention can be made from the poly(aryl ether sulfones) blend using standard thermoplastic polymer fabrication techniques. In particular, the plumbing articles of this invention can be manufactured using extrusion, injection molding, blow molding and thermoforming methods which are used to make plumbing articles from other thermoplastic resins.

The poly(biphenyl ether sulfone) useful in the plumbing articles of this invention comprises the repeating unit

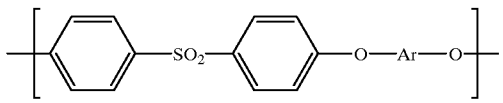

preferably wherein at least 50 and more preferably at least 75 mole percent of the divalent Ar groups or residues is p-biphenylene (also referred to herein as biphenyl) and the remainder, if any, is preferably at least one member selected from p-phenylene and 4,4'-diphenyl sulfone. In general, it is preferable to have the above-mentioned molar amount of biphenyl or p-biphenylene residues high, for example, at least about 90 mole percent, more preferably at least 95 mole percent, in the poly(biphenyl ether sulfone) since it results in a polymer with superior properties. The biphenyl residue, which can be derived from 4,4'-dihydroxy diphenyl has the following structure

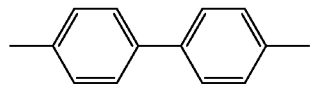

A poly (biphenyl ether sulfone) is available from Amoco Polymers Inc. under the trade name Radel R polyphenylsulfone. Radel R has the repeat unit

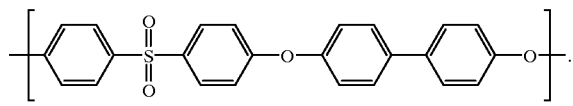

Radel R is the preferred poly(biphenyl ether sulfone) for making the blends for the plumbing articles of this invention.

The poly(aryl ether sulfones) comprising bisphenol A residues useful for making the blends for the plumbing articles of this invention comprise the repeating unit

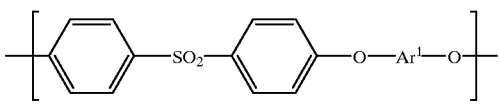

wherein preferably at least about 50, more preferably at least about 75 and most preferably at least about 90 mole percent of the divalent $Ar^1$ groups is the bisphenol A residue

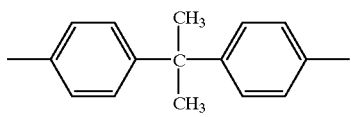

(i.e., derived from Bisphenol A or the like) and the remainder, if any, is preferably at least one member selected from p-phenylene, 4,4'-diphenyl sulfone and 4,4'-biphenyl. A poly (aryl ether sulfone) comprising the bisphenol A residue is available from Amoco Polymers Inc. under the trade name Udel polysulfone. Udel has the repeat unit

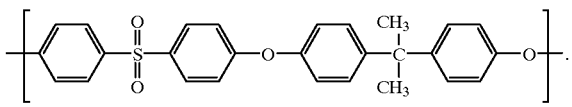

The Udel poly(aryl ether sulfone) is preferred for making the blends for the plumbing articles of this invention.

The weight ratio of the poly(biphenyl ether sulfone) to the second poly(aryl ether sulfone) comprising bisphenol A residues in the resin blend used to make the plumbing articles of this invention can be any weight ratio that provides for the desired properties of the plumbing articles, particularly resistance to hot water. Thus, for example, the weight ratio can be from about 80:20 to about 20:80. Preferably, the ratio is about 70:30 to about 30:70, and most preferably about 60:40 to about 40:60. A particularly suitable weight ratio of poly(biphenyl ether sulfone) to poly(aryl ether sulfone) comprising bisphenol A residues is about 50:50. Another particularly suitable weight ratio of poly (biphenyl ether sulfone) to poly(aryl ether sulfone) comprising bisphenol A residues is about 55:45.

In order for plumbing articles manufactured from thermoplastic resins to be acceptable for use in hot water applications, it is desirable that the thermoplastic resin exhibit good overall strength, good overall impact properties, and in particular, retain mechanical toughness after being exposed to hot water for extended periods, particularly while a stress is applied to the plumbing part while it is exposed to the hot water. The plumbing articles of the invention are manufactured from a thermoplastic resin that has such properties. The mechanical toughness can be conveniently evaluated using a standard tensile elongation test. The poly(aryl ether sulfone) blends used to make the plumbing articles of this invention preferably have at least a 10% ASTM D-638 elongation at break before and even after exposure to hot water of a temperature up to about 90° C for as long as 8000 hours. A 10% minimum elongation at break ensures that the engineering resin has sufficient mechanical toughness to undergo ductile yielding during tensile deformation when exposed to excessive stress. A yield elongation in the 3–9% range and a 10% minimum tensile elongation at break requirement is important to ensure that the resin has ductile yielding capability. This is important for avoiding or minimizing premature part failure during the normal installation or use of the plumbing article. The plumbing articles of this invention are preferably made from a thermoplastic resin comprising a poly(biphenyl ether sulfone) and a second poly(aryl ether sulfone) comprising bisphenol A residues wherein the thermoplastic resin when tested in accordance with ASTM Method No. D-638 exhibits a tensile elongation at break (TEB) of at least about 10%, preferably at least about 5% and a tensile elongation at yield, preferably of about 3 to about 9%, before and even after exposure of the test specimen to water at 90° C. for 8000 hours.

The plumbing articles of this invention, particularly the articles made from a blend of poly (biphenyl ether sulfone) and the poly (aryl ether sulfone) containing bisphenol A residue in a ratio of about 40:60 to 60:40 by weight, have low absorption of moisture, i.e., less than about 1.1 percent by weight moisture (water) at equilibrium when immersed in water at 23° C. (77° F.). Water absorption level of a plastic is an important consideration in the selection of materials for dimensionally demanding engineered parts used in hot water systems. This is because the absorption of moisture into a resin causes an expansion similar to a thermal expansion. Sulfone based polymers are known to experience about 0.01% linear dimensional increase for every 0.1% by weight of absorbed moisture in the polymer. These dimensional changes have to be accounted for by design engineers and they can be cumbersome from a design standpoint if they are large or if the dimensional tolerances of the component are very tight. The use of about 40–60 wt. % of poly (biphenyl ether sulfone) in the plumbing parts of this invention helps keep moisture related expansion to a minimum. A poly (biphenyl ether sulfone) such as Radel R exhibits an equilibrium moisture absorption at 23° C. (77° F.) of about 1.3% by weight while that for poly (aryl ether sulfone) based on bisphenol A is about 0.75% by weight. The 50/50 by weight blend of the two polymers offers a moisture absorption of about 1.0%. The blends used for the plumbing articles of this invention therefore represent an improvement in moisture-related dimensional stability over a poly(biphenyl ether sulfone) while at the same time offering the mechanical durability and toughness advantages highly desirable for plumbing articles. The poly(aryl ether sulfones) used in the plumbing articles of this invention can be prepared by methods known in the art. For example, they can be made by what is known as the carbonate method or by the alkali metal hydroxide method.

In the carbonate method, the polymers are prepared by contacting substantially equimolar amounts of the hydroxy-containing compounds such as bisphenol A or biphenol and dihalodiarylsulfones, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 170° C. to about 250° C., preferably from about 210° C. to about 235° C. for about one to 15 hours.

In a modification which is particularly suitable for making copolymers from bisphenol A and one or more additional dihydroxy compounds, the reactants other than the additional dihydroxy compounds are charged and heated at from about 120° C. to about 180° C. for about one to about 5 hours, the additional dihydroxy compounds are added, the temperature is raised and the mixture is heated at from about 200° C. to about 250° C., preferably from about 210° C. to about 240° C., for about one to 10 hours. The reaction is carried out in an inert atmosphere, e.g., nitrogen, at atmospheric pressure, although higher or lower pressures may also be used.

The polyarylethersulfone is then recovered by conventional techniques such as coagulation, solvent evaporation, and the like.

The solvent mixture comprises a solvent which forms an azeotrope with water, and a polar aprotic solvent. The solvent which forms an azeotrope with water includes, for example, an aromatic hydrocarbon such as benzene, toluene, xylene, ethylbenzene, chlorobenzene, and the like.

The polar aprotic solvents employed are those generally known in the art for the manufacture of poly(aryl ether sulfones) and include sulfur containing solvents such as those of the formula:

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents, all oxygens and two carbon atoms are bonded to the sulfur atom. Contemplated for use in making poly(aryl ether sulfones) are such solvents as those having the formula:

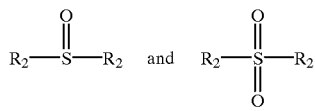

where the $R_2$ groups are independently lower alkyl, such as methyl, ethyl, propyl, butyl, and like groups, and aryl groups such as phenyl and alkylphenyl groups such as the tolyl group, as well as those where the $R_2$ groups are interconnected as in a divalent alkylene bridge such as

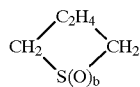

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionaly, nitrogen containing solvents may be used. These include dimethylacetamide, dimethylformamide and N-methyl-pyrrolidone.

The azeotrope forming solvent and polar aprotic solvent are used in a weight ratio of from about 1:10 to about 1:1, preferably from about 1:5 to about 1:3.

In the reaction, the hydroxy containing compound is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are obtained. Consequently, in order to secure the high polymers and system should be substantially anhydrous, and preferably contain less than 0.5 percent by weight water during the reaction. Preferably, after the desired molecular weight has been attained, the polymer is treated with an activated aromatic halide or an aliphatic halide such as methyl chloride or benzyl chloride, and the like. Such treatment of the polymer converts the terminal hydroxyl groups into ether groups which stabilize the polymer. The polymer so treated has good melt and oxidative stability.

While the carbonate method for preparing the polymer of this invention is simple and convenient, in some cases products of higher molecular weight can be made by the alkali metal hydroxide method. In the alkali metal hydroxide method, described by Johnson et al., U.S. Pat. Nos. 4,108,837 and 4,175,175, a double alkali metal salt of a dihydric phenol is contacted with a dihalobenzenoid compound in the presence of a sulfur containing solvent herein above defined under substantially anhydrous conditions.

Additionally, the polymers of this invention can be prepared by other methods known in the prior art, in which at least one dihydric phenol and at least one dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222.

The molecular weight of the poly(aryl ethers) utilized for manufacturing the plumbing articles of the instant invention is indicated by reduced viscosity data in an appropriate solvent such as methylene chloride, chloroform, N-methylpyrolidone, and the like. The reduced viscosities of the materials, as measured at concentrations of 0.2 g per 100 ml. at 25° C., are at least 0.3 dl/g, preferably at least 0.4 dl/g and, typically, not exceeding about 1.5 dl/g.

The compositions used for making the plumbing articles of this invention are prepared by any conventional mixing method. For example, a preferred method comprises mixing the two poly(aryl ether sulfones) in powder or granular form in an extruder and extruding the mixture into strands, chopping the strands into pellets and molding the pellets into the desired articles.

The blends for making the plumbing articles of this invention can include mineral fillers such as carbonates including chalk, calcite and dolomite; silicates including mica, talc, wollastonite, silicon dioxide, glass spheres, glass powders; aluminum; clay; quartz; and the like. Also, reinforcing fibers such as fiberglass, carbon fibers, and the like may be used. The compositions may also include other additives such as pigments, thermal stabilizers, ultraviolet light stablizers, plasticizers, lubricants, mold release agents and the like.

DESCRIPTION OF THE FIGURE

FIG. 1 shows, for example, four of the plumbing articles of this invention which can be made with a thermoplastic resin comprising a poly(biphenyl ether sulfone) and a second poly(aryl ether sulfone) comprising bisphenol A residues. Shown in the Figure is 1, a "T" joint with three female ends useful for connecting, for example, three pipes. The T joint is shown in partially removed view to show the internal structure. This T joint has a stopping ring 2 which limits the distance a pipe, for example, can be pushed into the joint. FIG. 1 also shows a 45° "elbow" joint 3 with two female ends for connecting, for example, two pipes at a 45° angle. FIG. 1 also shows a 90° joint 4 having one female end and one male end. FIG. 1 also shows a pipe segment 5.

U.S. Provisional Application No. 06/103,198, filed Oct. 6, 1998, is hereby incorporated by reference herein in its entirety.

EXAMPLES

The following examples provide specific illustrations of the present invention but are not to be construed in any way as a limitation on its scope generally.

Sample Preparation and Test Procedures

Two polymeric materials were used for the example of this invention: a poly(biphenyl ether sulfone) and a poly(aryl ether sulfone) comprising bisphenol A residues. The poly(biphenyl ether sulfone) used is a polymer having the repeat unit

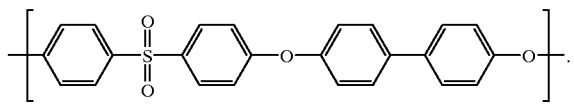

It is available commercially from Amoco Polymers Inc. under the trade name Radel R 5000. It has a reduced viscosity of approximately 0.55 dl/g as measured in N-methyl pyrrolidone at a concentration of 0.2 g/dl and 25° C., and a number-average molecular weight of about 18,000 as measured by gel permeation chromatography using methylene chloride as a solvent and a polystyrene calibration standard. This polymer is referred to hereafter as PSF-I. The poly(aryl ether sulfone) comprising bisphenol A residues is the commercial product under the trade name Udel P-1700, also supplied by Amoco Polymers Inc. It is a polymer having the following repeat unit

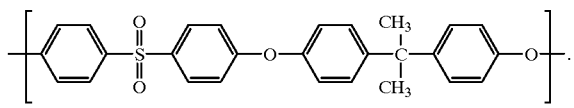

It has a reduced viscosity of about 0.5 g/dl in chloroform at 25° C. at a concentration of 0.2 g/dl, and a number-average molecular weight by gel permeation chromatography of about 15,000 using tetrahydrofuran (THF) as solvent and a polystyrene molecular weight calibration standard. This polymer is referred to hereafter as PSF-II. Both polymers were used in pellet form.

Controls A and B

Two neat polymers PSF-I and PSF-II were dried overnight in a Lydon dehumidified recirculating air oven at a temperature of 300° F. Parts were then injection molded on a Battenfeld injection molding machine with a 3 oz. injection capacity to produce standard ASTM mechanical test specimens with a nominal thickness of ⅛ inch. Mechanical properties were measured per the ASTM procedure shown below.

| Property | ASTM Method No. |
|---|---|
| Tensile Strength | D-638 |
| Tensile Elongation at Break | D-638 |
| Tensile Elongation at Yield | D-638 |

Examples 1 to 3

The compositions shown in Table I were mixed well as pellets and placed in a dehumidified air oven at 300° F. for about 16 hrs. (overnight) for drying. The dry blends were then extruded using a 25 mm diameter twin screw double vented Berstorff extruder having an L/D ratio of 33/1 according to the conditions profile shown in Table IA. The first vent port was open to the atmosphere, the second was connected to a vacuum pump. The extruder was fitted with a double strand die. The polymer extrudate was pelletized after passing through a water trough for cooling. All blends were extruded and pelletized without incident at the throughput rates indicated in Table IA. Between successive blend compositions, two pounds of extrudate were designated as "transition" material and discarded. From past experience, this amount is sufficient to effectively displace the melt in the extruder so the compositions of the final blends do not differ from those of the dry pellet mixes.

The three blends were dried again overnight in the Lydon oven at 300° F. and injection molded the following day on the Battenfeld injection molding machine described above to generate the needed ASTM parts.

Example 4

The four following ingredients in the weight percentages shown were weighed into a stainless steel 55 gallon drum to produce a total batch mix of 200 lbs:

| | |
|---|---|
| PSF-I | 48.875% |
| PSF-II | 48.875% |
| Titanium Dioxide | 2.00% |
| Zinc Oxide | 0.25% |

The latter two ingredients were included to give the blend white pigmentation. The mix was tumbled on an automated drum tumbler for about 15–20 minutes, after which the mix was fed to the throat of a 58 mm diameter corotating, partially intermeshing, Werner & Pfleiderer ZSK twin screw extruder having an L/D ratio of 30. The mix was metered into the feed throat at a rate of 300 lb./hr. using a gravimetrically controlled feeder. The extruder conditions used for this run are shown in Table 1B. The extruder blend melt was stranded through a 10-hole, 3 mm diameter die. The melt strands were cooled to solidification in a water bath and pelletized in a manner similar to that described for Examples 1–3. The blend pellets, which had an opaque off white appearance, were dried overnight, then injection molded using procedures similar to those described in Examples 1–3.

TABLE 1A

COMPOSITION AND EXTRUSION CONDITIONS OF BLENDS FOR EXAMPLES 1–3

| Example[a] | 1 | 2 | 3 |
|---|---|---|---|
| Wt. % PSF-I | 67 | 50 | 25 |
| Wt. % PSF-II | 33 | 50 | 75 |
| Temperature Settings, ° C. | | | |
| Zone 1 | 310 | 280 | 280 |
| Zone 2 | 340 | 515 | 315 |
| Zone 3 | 340 | 530 | 330 |
| Zone 4 | 340 | 340 | 330 |
| Zone 5 | 340 | 540 | 300 |
| Zone 6 as Die | 340 | 340 | 330 |
| Melt | 387 | 385 | 368 |

[a]Conditions common to all blend runs are approximately as follows:
Screw Speed 200 rpm
Throughput Rate 25 lb./hr.
Vent 1 (Barrel Zone2) open to atmosphere
Vent 2 (Barrel Zone 4) 30 in Hg vacuum

TABLE 1B

EXTRUSION CONDITIONS FOR BLEND OF EXAMPLE 4

| | Approximate Temperature Setting, ° C. |
|---|---|
| Zone 1 | 250 |
| Zone 2 | 300 |
| Zone 3 | 329 |
| Zone 4 | 330 |
| Zone 5 | 348 |
| Zone 6 | 334 |
| Zone 7 | 330 |
| Zone 8 | 300 |
| Zone 9 | 300 |
| Die | 327 |
| Melt | 355 |
| Other Conditions | |
| Screw Speed (rpm) | 350 |
| Vacuum (in Hg) Barrel Zone 7 | 28 |
| Throughput Rate (lb./hr.) | 300 |

Hot Water Resistance

Tensile properties of blends used for making the plumbing articles of this invention are shown in Table 2. Both tensile strength (TS) and tensile elongation at break (TEB) were measured for PSF-I (Control A), PSF-II (Control B) and for blends of these two poly(aryl ether sulfones). The TS and TEB measurements were taken on the "as molded" polymer as well as after aging for one week in 82° C. (180° F.) water with and without stress applied to the test specimen. The stress was applied by clamping the test bar to a circular arc fixture which resulted in approximately a 4,000 psi applied stress.

These data demonstrate that the Example 1–3 blends of the poly(biphenyl ether sulfone) with the poly(aryl ether sulfone) having bisphenol A residues retained excellent tensile properties after exposure to hot water for one week with and without applied stress. For example, Example 2, which is a 50:50 blend of the poly(biphenyl ether sulfone) and the poly(aryl ether sulfone) containing bisphenol A residues, after aging in hot water without stress had a tensile elongation at break of 43% and, after aging in hot water with applied stress, had a tensile elongation of 56%. These results are unexpected based on the performance of Control A, the poly(biphenyl ether sulfone) and Control B, poly(aryl ether sulfone) containing bisphenol A residues. As shown by the data in the table, Control A retained its tensile properties after aging with stress whereas Control B, after aging with stress had a tensile elongation at break of only 2.6% and showed no yield elongation thus exhibiting brittle behavior. However, the 50:50 mixture unexpectedly had a tensile elongation at break of 56% along with ductile yielding demonstrating that the blend has outstanding tensile properties after exposure to hot water. A tensile elongation at break TEB of 10% coupled with post yield elongation at rupture is a sufficient minimum for mechanical ductility in an engineering resin.

Tensile elongation data after very long term exposure to water at 60° C. (140° F.) and 90° C. (190° F.) for the 50:50 blend of PSF-I and PSF-II described in example 4 are shown in Table 3. As with the data in Table 2, the data in Table 3 demonstrate the unexpected and outstanding properties of the 50:50 blend after 8000 hours in water at 90° C. This blend showed good ductility retention as measured by tensile elongation at break to a level comparable to that of Control A. In contrast, Control B exhibited borderline ductility when aged in 90° C. water with tensile elongation at break values close to the yield elongation so that the material can be considered semi-brittle. In fact, Control B exhibited tensile elongation at break of less than 10% after only 250 hours of aging in 90° C. water as can be seen from Table 3. Both the Control A and the 50:50 blend show comparable elongation at break of about 20% after 8000 hours exposure to 90° C. water. Such tensile elongation is considered high and is excellent for manufacturing the plumbing articles of this invention.

TABLE 2

TENSILE PROPERTIES BEFORE AND AFTER EXPOSURE TO 82° C. WATER FOR ONE WEEK WITH AND WITHOUT STRESS

| | As Molded[a] | | | Aged with no Stress[b] | | | Aged with Stress[c] | | |
|---|---|---|---|---|---|---|---|---|---|
| Example | TS[d] | TEB[e] | TEY[f] | TS | TEB | TEY | TS | TEB | TEY |
| 1 | 10,500 | 29 | 7.8 | 10,600 | 25 | 7.6 | 10,800 | 36 | 7.9 |
| 2 | 10,300 | 41 | 7.4 | 10,500 | 43 | 7.0 | 10,700 | 56 | 7.6 |
| 3 | 10,500 | 51 | 7.1 | 10,900 | 43 | 6.8 | 10,800 | 16 | * |

TABLE 2-continued

TENSILE PROPERTIES BEFORE AND AFTER EXPOSURE
TO 82° C. WATER FOR ONE WEEK WITH AND WITHOUT STRESS

| | As Molded[a] | | | Aged with no Stress[b] | | | Aged with Stress[c] | | |
|---|---|---|---|---|---|---|---|---|---|
| Example | TS[d] | TEB[e] | TEY[f] | TS | TEB | TEY | TS | TEB | TEY |
| Control A | 10,600 | 75 | 8.2 | 10,500 | 74 | 8.2 | 10,700 | 57 | 8.2 |
| Control B | 11,200 | 67 | 5.9 | 11,200 | 19 | 5.5 | 7,950 | 2.6 | ** |

[a]Parts as molded
[b]Parts aged in 82° C. water for 1 week no stress applied
[c]Parts aged in 82° C. water for 1 week with stress applied by clamping test bats onto a circular arc fixture having a 5.63 inch outer radius to generate about 4,000 psi stress based on tensile moduli of Controls A and B
[d]TS = Tensile Strength at Yield (psi) except for Control B, Aged with Stress, which showed no yield (i.e., it broke prematurely). For this sample the TS is tensile strength at break.
[e]TEB = Tensile Elongation at Break (%)
[f]TEY = Tensile Elongation at Yield (%)
*In different tests, this value ranged from no yielding to a TEY of 6.7%
**No Yield

TABLE 3

ROOM TEMPERATURE TENSILE ELONGATION
AFTER LONG TERM EXPOSURE TO HOT WATER WITHOUT STRESS

| Example | 0 Hrs | 250 Hrs | 500 Hrs | 1,000 hrs | 2,000 hrs | 4000 hrs | 8000 hrs. |
|---|---|---|---|---|---|---|---|
| | TEB[a] and TEY[b] After 60° C. Water Aging TEB/TEY | | | | | | |
| 4 | 44/6.7 | 91/6.8 | 82/6.7 | 94/6.6 | 70/6.4 | 63/6.4 | 72/6.6 |
| Control A | 72/8.0 | 107/7.9 | 106/8.1 | 100/7.9 | 82/7.8 | 86/7.7 | 61/7.8 |
| Control B | 66/5.9 | 53/5.9 | 85/5.8 | 35/5.7 | 20/5.5 | 30/5.6 | 17/5.6 |
| | TEB and TEY After 90° Water Aging TEB/TEY | | | | | | |
| 4 | 44/6.7 | 49/6.3 | 44/6.3 | 39/5.7 | 54/5.9 | 15/5.7 | 21/6.0 |
| Control A | 72/8.0 | 73/7.5 | 49/7.5 | 56/7.0 | 68/7.0 | 67/7.1 | 22/7.3 |
| Control B | 66/5.9 | 7.3/5.5 | 7.2/5.2 | 5.8/5.0 | 6.1/5.0 | 5.8/5.0 | 5.1/4.9 |

[a]TEB = Tensile Elongation at Break (%)
[b]TEY = Tensile Elongation at Yield (%)

What is claimed is:

1. Plumbing articles made from a thermoplastic resin comprising a poly(biphenyl ether sulfone) and a poly(arylether sulfone) comprising the repeat unit

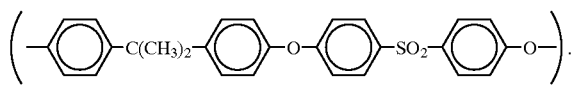

2. The plumbing articles of claim 1 wherein the poly(biphenyl ether sulfone) and the poly(arylether sulfone) are present in the thermoplastic resin in a weight ratio of about 80:20 to about 20:80.

3. The plumbing articles of claim 1 wherein the thermoplastic resin exhibits tensile yielding and a tensile elongation at break of at least 10% when tested according to ASTM D-638 at 23° C.

4. The plumbing articles of claim 1 wherein the thermoplastic resin exhibits tensile yielding and a tensile elongation at break of at least 10% when tested according to ASTM D-638 at 23° C. after exposure to water at 90° C. for 8000 hours.

5. The plumbing articles of claim 1 wherein the poly(biphenyl ether sulfone) has a reduced viscosity in N-methylpyrolidone at 25° C. of at least about 0.3 dl/g.

6. The plumbing articles of claim 1 wherein the poly(aryl ether sulfone) comprising bisphenol A residues has a reduced viscosity in chloroform at 25° C. of at least 0.3 dl/g.

7. The plumbing articles of claim 2 wherein the weight ratio is about 60:40 to about 40:60.

8. The plumbing articles of claim 2 wherein the weight ratio is about 55:45 to about 45:55.

9. The plumbing articles of claim 2 wherein the weight ratio is about 50:50.

10. A method for making plumbing articles comprising molding the plumbing articles from a thermoplastic resin comprising a poly(biphenyl ether sulfone) comprising the following repeating unit

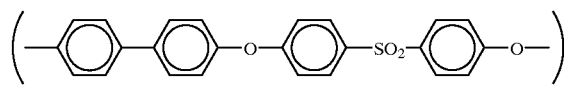

and a poly(aryl ether sulfone) comprising the following repeating unit

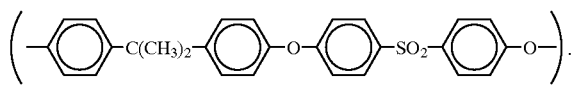

wherein the resins are present in a weight ratio of about 80:20 to about 20:80.

11. The plumbing articles of claim 1 wherein said (biphenyl ether sulfone) comprises the repeat unit

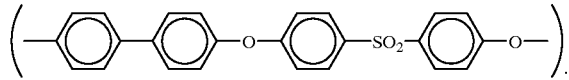

12. The plumbing articles of claim 1 wherein said (biphenyl ether sulfone) comprises from about 75 to 100 mole % of the repeat unit

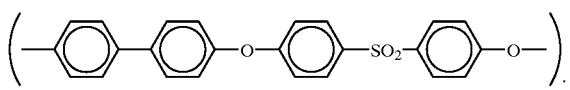

13. The plumbing articles of claim 1 wherein said poly (arylether sulfone) comprises from about 75 to 100 mole % of said repeat unit.

* * * * *